US009307067B2

(12) United States Patent
Debates et al.

(10) Patent No.: US 9,307,067 B2
(45) Date of Patent: Apr. 5, 2016

(54) CONTEXTUALLY UPDATING WIRELESS DEVICE FIRMWARE

(71) Applicant: Google Technology Holdings LLC, Mountain View, CA (US)

(72) Inventors: Scott P. Debates, Crystal Lake, IL (US); Francis W. Forest, Chicago, IL (US); Mary K. Hor-Lao, Vernon Hills, IL (US); Douglas A. Lautner, Round Lake, IL (US); Jagatkumar V. Shah, Lake In The Hills, IL (US)

(73) Assignee: Google Technology Holdings LLC, Mountain View, CA (US)

( * ) Notice: Subject to any disclaimer, the term of this patent is extended or adjusted under 35 U.S.C. 154(b) by 0 days.

(21) Appl. No.: 14/446,637

(22) Filed: Jul. 30, 2014

(65) Prior Publication Data

US 2016/0036956 A1    Feb. 4, 2016

(51) Int. Cl.
*G06F 15/16* (2006.01)
*H04M 1/725* (2006.01)
*H04W 76/02* (2009.01)
*G06F 9/445* (2006.01)
*G06F 17/30* (2006.01)

(52) U.S. Cl.
CPC ............. *H04M 1/72525* (2013.01); *G06F 8/65* (2013.01); *G06F 17/30864* (2013.01); *H04W 76/023* (2013.01)

(58) Field of Classification Search
CPC ....... H04W 8/245; H04W 4/06; H04W 88/08; H04L 49/70
USPC ........................... 455/410, 411, 419, 423, 425
See application file for complete search history.

(56) References Cited

U.S. PATENT DOCUMENTS

| 8,484,633 | B2 | 7/2013 | Kim |
| 8,520,942 | B2 | 8/2013 | Boncyk et al. |
| 8,549,115 | B2 | 10/2013 | Park et al. |
| 2011/0125601 | A1 | 5/2011 | Carpenter et al. |
| 2012/0184319 | A1 | 7/2012 | Wang et al. |
| 2014/0068592 | A1 | 3/2014 | Chitre et al. |

FOREIGN PATENT DOCUMENTS

| EP | 1780638 A1 | 5/2007 |
| EP | 2476273 A2 | 7/2012 |

OTHER PUBLICATIONS

International Search Report and Written Opinion of International Application No. PCT/US2015/042924, mailed Oct. 19, 2015, 10 pp.

*Primary Examiner* — Sam Bhattacharya
(74) *Attorney, Agent, or Firm* — Shumaker & Sieffert, P.A.

(57) ABSTRACT

A method includes a first wireless device initiating a wireless connection to a second wireless device and monitoring at least one context associated with one of the wireless connection and the second device. When contextual data is received that indicates a condition, the method further includes determining, based on a search of a firmware update service (FUS) database, whether a firmware update for the second wireless device is available within the FUS database. And when an available firmware update is received from the FUS database, the method includes triggering the first device to initiate the firmware update for the second device. The triggering of the first device to initiate the firmware update includes: transmitting a command to place the second device in firmware update mode; and forwarding the firmware update to the second device, such that the first device controls and/or initiates the firmware upgrade of the second device.

20 Claims, 11 Drawing Sheets

| DEVICE TYPE/ID 450 | MAN. ID 455 | MODEL NO 460 | FW Version 465 | FW 470 | FW UICI 475 | Conditions 480 | Corr. Score 485 |
|---|---|---|---|---|---|---|---|
| BT Headset | Motorola | MMx1 | Ver.5.1 | X.exe | Xi.exe | Cond [1], [2], [5] | [7], [5], [9] |
| BT Headset | Motorola | MMx2 | Ver.5.3 | X2.exe | X2i.exe | Cond [1], [2], [5] | [3], [4], [6] |
| BT Headset | Plantronics | M165 | Ver.3.1 | Y.exe | Yi.exe | Cond [1], [2], [4] | [8], [7], [8] |
| N Router | Cisco | Rtx123 | Ver.2.2 | Z.exe | Zi.exe | Cond [2], [3] | [9], [9] |
| Google Glass | Google | GG123 | Ver.1.4 | A.exe | Ai.exe | Cond [3], [4] | [7], [8] |
| ... | ... | ... | ... | ... | ... | ... | ... |

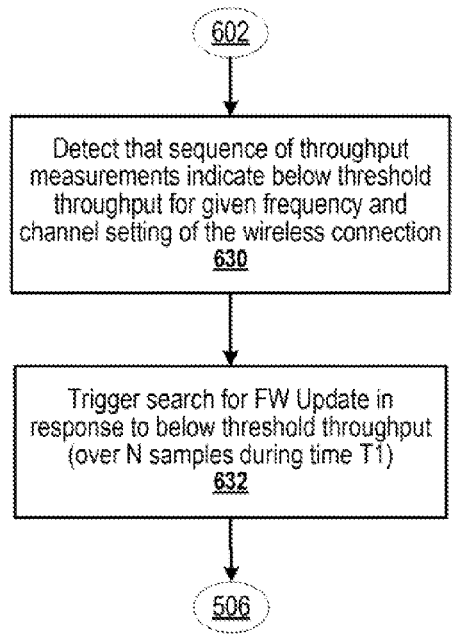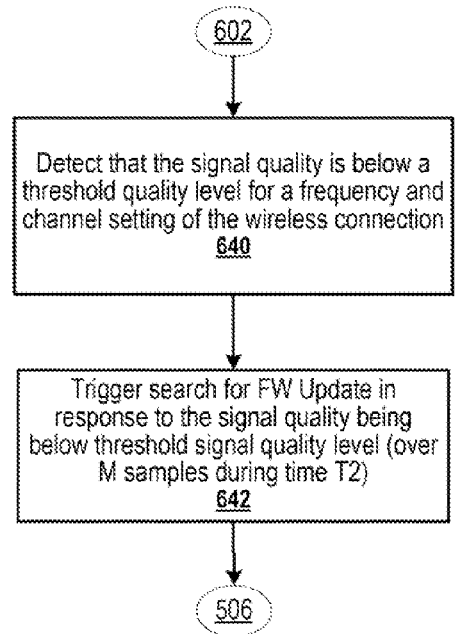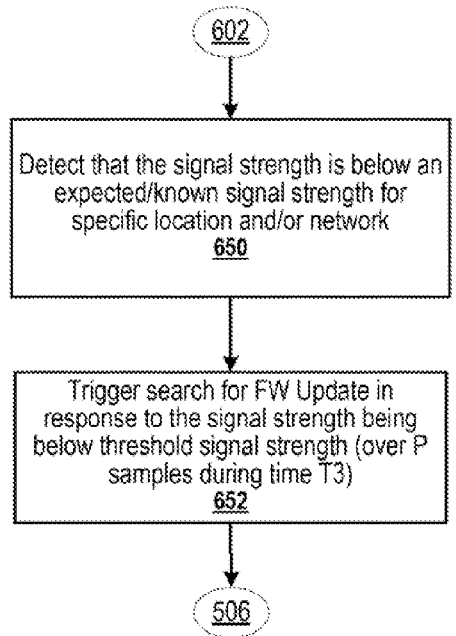
FIG. 6B
FIG. 6C
FIG. 6D ns requires a handshake operation in which certain setup 20 wireless device to which the wireless device is communica-# CONTEXTUALLY UPDATING WIRELESS DEVICE FIRMWARE

BACKGROUND

1. Technical Field

The present disclosure generally relates to wireless user devices, and in particular to a method and system for updating the firmware of a wireless device based on one or more contexts associated with the device.

2. Description of the Related Art

Smart phones and other wireless user devices are commonly designed with the capability to wirelessly connect a first device to another device within certain proximity of the first device and thereby communicate information with the other device. Examples of such wireless connections and/or protocols include near field communication (NFC) or Bluetooth® or Wireless fidelity (WiFi) or radio frequency identification (RFID). The establishment of these wireless connections requires a handshake operation in which certain setup procedures are implemented at the first device and/or the other device to enable the connection. Additionally, once a connection is established, the quality of the connection between the devices can be affected by exterior factors, such as the use environment as well as interior factors, such as the firmware of one or both of the devices. Problems with establishing connection and/or with the quality of the connection are often reported as problems with the first user device initiating the connection. However, the detected problems can at times be entirely due to the second device, and subsequent modifications and/or changing of the first device may not resolve the detected problems.

BRIEF DESCRIPTION OF THE DRAWINGS

The description of the illustrative embodiments is to be read in conjunction with the accompanying drawings, which provide specific examples that are not intended to limit the scope of the disclosure, and wherein:

FIG. 4B provides a more detailed view of an example FUS database of current wireless device firmware assigned according to identifying characteristics of the respective wireless devices, in accordance with one embodiment;

DETAILED DESCRIPTION

Figure 1:
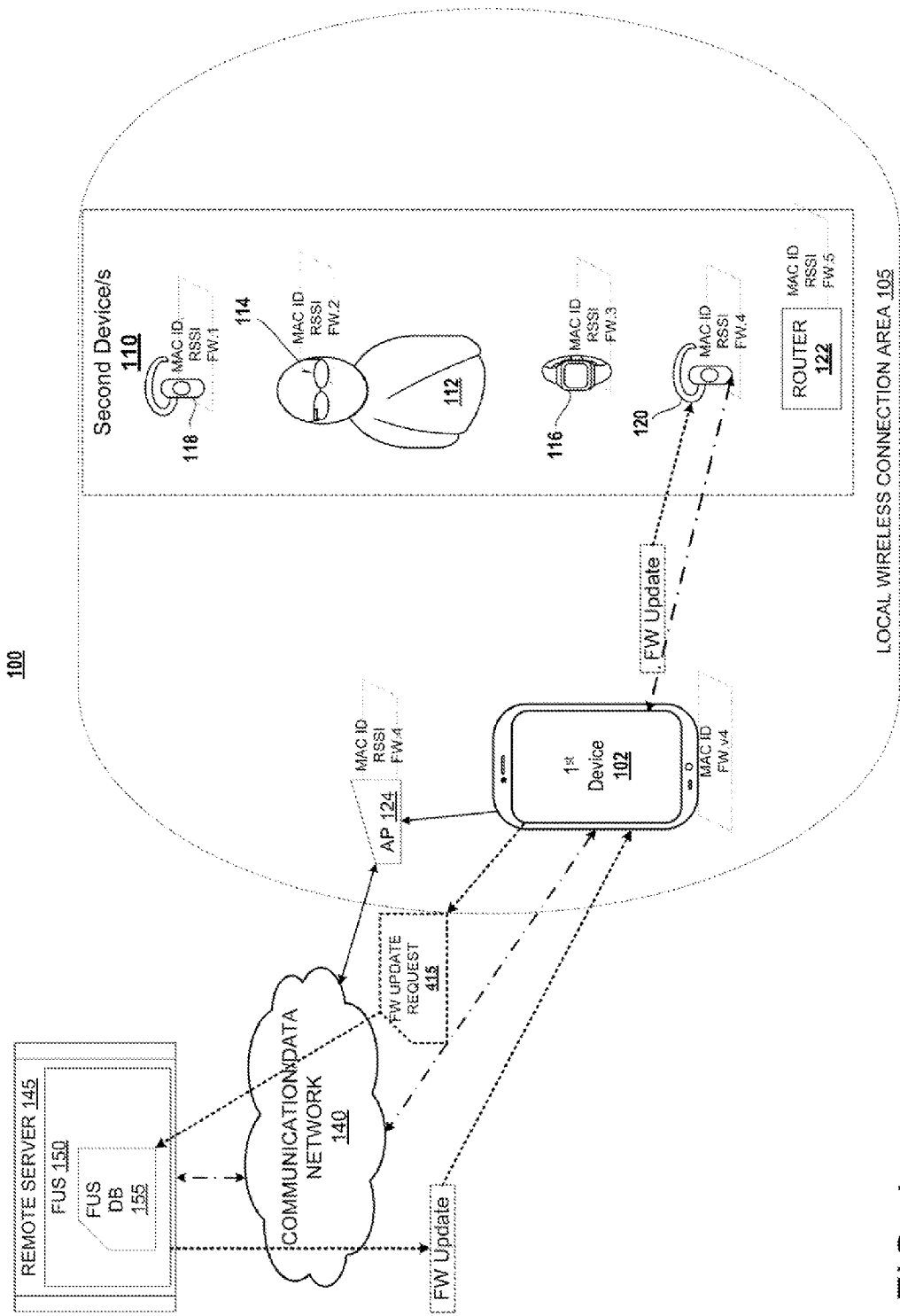
FIG. 1 illustrates an example device pairing environment in which aspects of a short-range wireless connection between a first wireless device, such as a mobile phone, and a second device are monitored to determine whether a firmware upgrade of at least one of the two devices is required, according to one or more embodiments.

The illustrative embodiments of the present disclosure provide a wireless device and a method performed within a wireless device that facilitates updating firmware of a second wireless device to which the wireless device is communicatively connected via a short range communication channel. According to one aspect, the method includes a first wireless device initiating a wireless connection to a second wireless device and monitoring at least one context associated with one of the wireless connection and the second wireless device. The method further includes, when contextual data is received that indicates a condition affecting one or more of the wireless connection and operation of the second device: determining whether a firmware update for the second wireless device is available within a firmware update service (FUS) database; and when an available firmware update is received from the FUS database, triggering the first wireless device to initiate the firmware update for the second wireless device.

According to one aspect, the triggering of the first wireless device to initiate the firmware update includes: transmitting a command to place the second device in firmware update mode; and forwarding the firmware update to the second device, such that the first device controls and/or initiates the firmware upgrade of the second device.

In the following detailed description, exemplary embodiments in which various aspects of the disclosure may be practiced are described in sufficient detail to enable those skilled in the art to practice the invention. It is to be understood that other embodiments may be utilized and that logical, architectural, programmatic, mechanical, electrical and other changes may be made without departing from the spirit or scope of the present disclosure. The following detailed description is, therefore, not to be taken in a limiting sense, and the scope of the present disclosure is defined by the appended claims and equivalents thereof.

The description of the illustrative embodiments can be read in conjunction with the accompanying figures. Embodiments incorporating teachings of the present disclosure are shown and described with respect to the figures presented herein. Within the descriptions of the different views of the figures, similar elements are provided similar names and reference numerals as those of the previous figure(s). The specific numerals assigned to the elements are provided solely to aid in the description and are not meant to imply any limitations (structural or functional or otherwise) on the described embodiment. It will be appreciated that for simplicity and clarity of illustration, elements illustrated in the figures have not necessarily been drawn to scale. For example, the dimensions of some of the elements are exaggerated relative to other elements.

It is understood that the use of specific component, device and/or parameter names, such as those of the executing utility, logic, and/or firmware described herein, are for example only and not meant to imply any limitations on the described embodiments. The embodiments may thus be described with different nomenclature and/or terminology utilized to describe the components, devices, parameters, methods and/or functions herein, without limitation. References to any specific protocol or proprietary name in describing one or more elements, features or concepts of the embodiments are provided solely as examples of one implementation, and such references do not limit the extension of the claimed embodiments to embodiments in which different element, feature, protocol, or concept names are utilized. Thus, each term utilized herein is to be given its broadest interpretation given the context in which that term is utilized.

As further described below, implementation of the functional features of the disclosure described herein is provided within processing devices and/or structures and can involve use of a combination of hardware, firmware, as well as several software-level constructs (e.g., program code and/or program instructions and/or pseudo-code) that execute to provide a specific utility for the device or a specific functional logic. The presented figures illustrate both hardware components and software and/or logic components.

Those of ordinary skill in the art will appreciate that the hardware components and basic configurations depicted in the figures may vary. The illustrative components are not intended to be exhaustive, but rather are representative to highlight essential components that are utilized to implement aspects of the described embodiments. For example, other devices/components may be used in addition to or in place of the hardware and/or firmware depicted. The depicted example is not meant to imply architectural or other limitations with respect to the presently described embodiments and/or the general invention.

FIG. 1 illustrates an example paired device firmware updating (PDFU) environment 100 in which a firmware updating service (FUS) 150 can be utilized to facilitate updating firmware of one or more wireless devices in a paired connection with each other. As illustrated, PDFU environment 100 includes first wireless device 102, such as a mobile phone. For simplicity, first wireless device 102 shall be referred to as first device 102. While illustrated as a mobile phone, it is appreciated that first device 102 can be any one or a number of different devices and/or device types that supports wireless pairing to a second device (110) in communication proximity of the first device 102. PDFU environment 100 also includes one or more second device/s 110 that are located within a local wireless connection area (LWCA) 105 of first wireless device 102. Second device/s 110 can include various devices of a user 112, such as but not limited to wearable eyeglasses 114, such as Google® Glass, wearable smart watch 116, first BT headset (or earpiece) 118, second BT headset 120, and wireless router 122. Within the illustrative embodiment, second BT earpiece 120 is shown to be the selected second device that is currently in a paired connection over a wireless connection (illustrated via the dashed and dotted line) with first device 102. While not shown as one of the referenced second devices 110, it is appreciated the access point (AP) 124 can also be considered one of second devices 110.

According to the illustrative embodiment, each second device 110 has a corresponding device identifier (ID), which for simplicity will be referenced herein as a machine (MAC) ID. Additionally, each second device 110 within LWCA 105 provides a signature that includes the respective MAC ID and received signal strength indication (RSSI). The devices associated signature is shown next to each second device 110. According to one embodiment, also included within the signature is an indication of a current firmware version installed within the particular second device 110. It is appreciated that the signature can include other identifying information such as a vendor or manufacture ID. It is further appreciated that, in alternate embodiments, the current firmware version can be a value that is not directly provided with the device's signature and instead has to be retrieved from the second device 110. Both first device 102 and AP 124 also have associated signatures providing the respective device IDs and firmware versions.

LWCA 105 represents the surrounding area of first device 102 within which one or more second devices 110 are in pairing communication range (i.e., close enough to complete a local pairing with the first device 102). According to one aspect of the disclosure, one or more of the second devices 110 connects to first device 102 at a known location and/or communicates over a known network, including details such as the network frequency and channel. Thus LWCA 105 can represent or provide information about a location of the paired connection.

As introduced above, PDFU environment 100 also includes FUS 150, which is located on a remote server 145 (representing one or a plurality of servers). First device 102 is able to connect to and exchange communication with FUS 150 via communication and data network (CDN) 140. Connection with or to CDN 140 can be via direct wireless network service or a secondary Internet-based network, accessible to first device 102 via AP 124, for example. The two-way connectivity paths are illustrated as dashed-and-dotted bi-directional arrows. In the illustrative embodiment, FUS 150 is hosted on remote server 145 and includes FUS database (DB) 155 illustrated by FIG. 5. Descriptions of the remote server 145 and FUS DB 155 are presented below within the descriptions of FIGS. 3 and 4. In an alternate embodiment, however, FUS 150 is located within first device 102 and the associated functionality that enables the checking of the firmware version and subsequent updates to firmware of a connected second device 110 is completed via processes occurring on first device 102.

Figure 2:
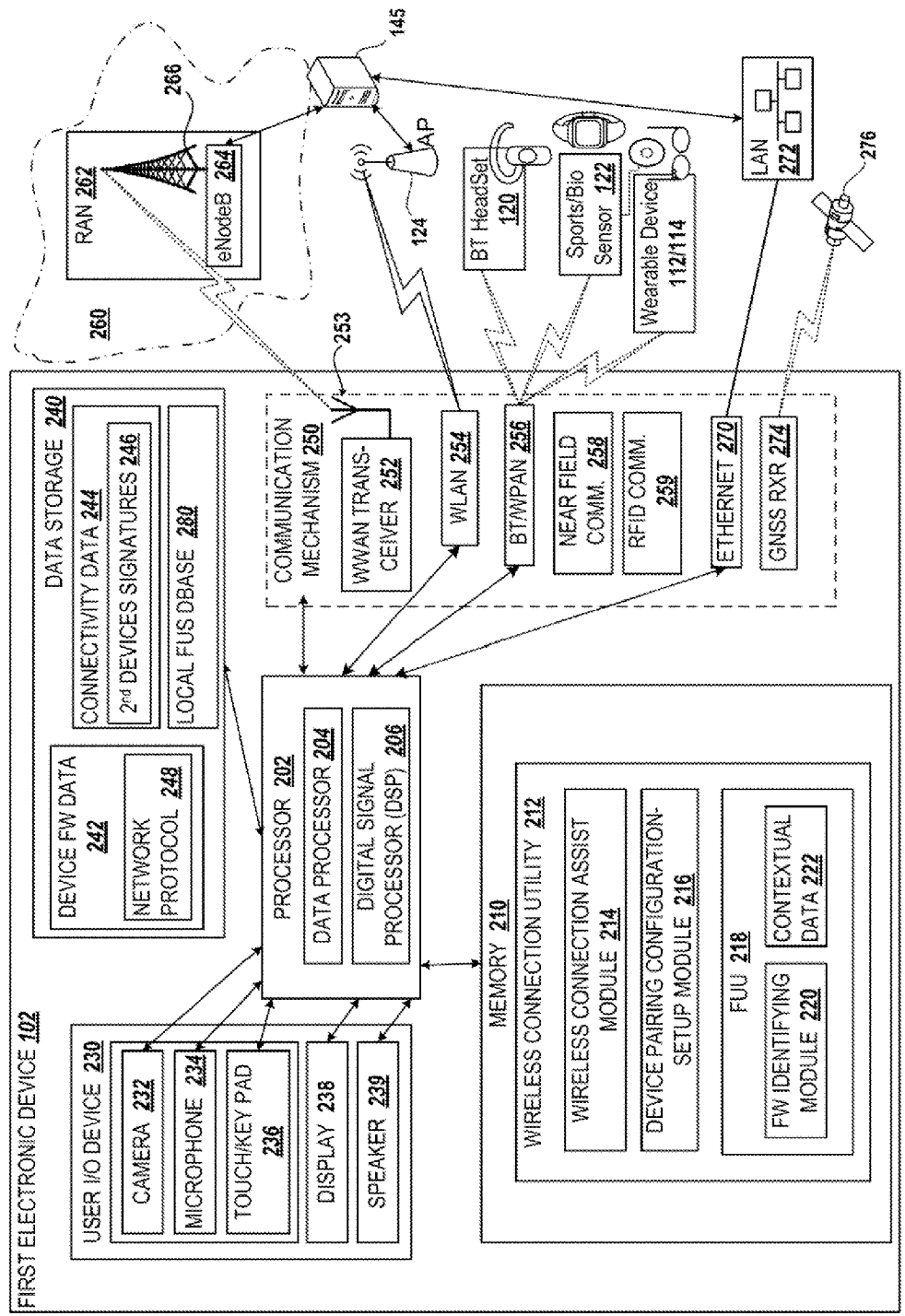
FIG. 2 provides a more detailed view of functional components of the first device, represented as a mobile phone, which supports wireless connectivity with both a near-by second device and a remote firmware updating service (FUS), in accordance with one or more embodiments.

FIG. 2 provides a more detailed view of functional components of the first device 102, represented as a wireless communication device such as a mobile phone, which supports wireless connectivity with both near-by second device/s 110 (FIG. 1) and a remote FUS 150 (FIG. 1), in accordance with one or more embodiments. While illustrated and occasionally referred to as a mobile phone, first device 102 can be one of a host of different types of user communication devices, including but not limited to, a smart-phone, a desktop computer, a laptop, a net-book, an ultra-book, and/or a tablet computing device. The various devices provide and/or include the necessary hardware and software to support the various wireless or wired communication functions as part of PDFU environment 100 (FIG. 1).

First device 102 includes an integrated circuit (IC) processor 202, which connects via a plurality of bus interconnects (illustrated by the bi-directional arrows) to a plurality of functional components of first device 102. Processor 202 can include one or more programmable microprocessors, such as a data processor 204 and a digital signal processor (DSP) 206, which, in some embodiments, may both be integrated into a single processing device. Processor 202 controls the communication, application data processing and signal processing, user interfacing, and other functions and/or operations of first device 102. Connected to processor 202 is memory 210, which can include volatile memory and/or non-volatile memory. One or more executable applications or programmed utilities can be stored within memory 210 for execution by data processor 204 or in certain signal processing scenarios by DSP 206. For example, memory 210 is illustrated as containing a wireless connection utility 212, which includes wireless connection/connectivity assist (WCA) module 214 and wireless pairing configuration setup (WPCS) module 216. WPCS module 216 includes a list of discovered second devices and other functions that enable local pairing and/or communication of first device with one or more of the discovered second devices over one or more networks. WPCS module 216 also includes firmware update utility (FUU) 218 which when executed on processor 202 enables the first device 102 to perform some of the features and functions described herein. FUU 218 includes FW identifying module 220 and a databased or knowledgebase of contextual data 222. The associated functionality and/or usage of each of the software modules and data will be described in greater detail within the descriptions which follow. It is appreciated that memory 210 can also include other applications and/or services (not shown). In alternate embodiments, one or more of the utilities illustrated within memory 210 can exist as firmware in other locations within first device 102 and be utilized for controlling the operations of or execution by other controllers or specialized or dedicated processors within first device 102.

First device 102 can include one or more input/output (I/O) devices 230 that operate as user interface devices. These I/O devices 230 can include one or more input devices, such as camera 232, microphone 234, and touch screen and/or touch pad and/or keypad 236. The I/O devices 230 can also include one or more output devices, such as display 238 and speaker 239. The input devices can be utilized to access applications on the first device 102, such as WPCS module 216 and enable user facilitation of the firmware update processes described herein, where appropriate.

First device 102 also includes data storage 240 that stores one or more data utilized during operation of first device 102. Data storage 240 is also coupled to processor 202 and can be any type of available storage device that is integral, attachable or insertable and capable of storing one or more application software and data. It is further appreciated that in one or more alternate embodiments, data storage 240 can actually be remote storage and not an integral part of the first device 102. Among the stored data are local FW version data 242 and second device connectivity data 244. Local FW version data 242 can include network protocol 248, which can be a protocol shared by the one or more second devices that first device 102 pairs with. Connectivity data 244 includes identifying signal data 246 (such as, but not limited to MAC ID—RSSI data pairs) of detected second devices. In one embodiment, data storage 240 can also include a locally stored FUS database 280 having firmware update information for a variety of second devices.

As illustrated, first device 102 is capable of supporting multiple different forms of communication using several different technologies, according to a plurality of alternate embodiments. To support wireless communication, first device 102 has at least one and preferably multiple of the different components that are illustrated within communication mechanism(s) 250. Communication mechanism(s) 250 includes wireless wide area network (WWAN) transceiver 252 with connected antenna 253, which enables first device 102 to communicate with a radio access network (RAN) 262 of a cellular network 260, which can be synonymous with communication and data network 140 (FIG. 1) for continuity with the FIG. 1 description. For simplicity, one connected antenna 253 of WWAN transceiver 252 is depicted. However, WWAN transceiver 252 may be associated with more than one antenna 253, each antenna having one or more selected bandwidths of operation to support different modes of communication or for simultaneous communication in different communication technologies. RAN 262 is generally represented as including a base station, depicted as an evolved base node ("eNodeB") 264 that transmits and receives communication signals over a base station antenna 266. The eNodeB 264 is illustrated communicatively connected to server 145, which is an example computing device on which the FUS 150 (FIG. 1) is hosted.

In addition to WWAN transceiver 252 and associated components, first device 102 can include a wireless local area network (WLAN) module 254 to communicate with server 145 and/or wireless networks accessible via wireless access point 124. As an example, the WLAN module 254 may support IEEE 802.11 standards with the access point 124 operating as a WiFi hotspot. First device 102 can also include one or more close range wireless communication technology modules, including a wireless personal access network (WPAN) or Bluetooth® transceiver 256 for communication with WPAN devices, depicted as a Bluetooth® headset 120, a sports/biometric/physiological sensor, illustrated as watch 122, and other wearable device/s 112/114 (such as heads up display, camera, camera-equipped eye-glasses, etc.). WPAN transceiver 256 can support technologies such as Infrared Data Association (IrDA) standard, Wireless Universal Serial Bus (USB), Bluetooth®, Z-Wave, ZigBee, Body Area Network, and ANT+. Alternatively or in addition, close range wireless communication provided by first device 102 can include a near field communication (NFC) transceiver 258, such as can be utilized for exchanging files with another user device, such as wearable device 112/114. As further shown, first device 102 can also be configured with a separate RFID module 259 to support RFID data communication.

Alternatively or in addition, first device 102 can also include components for wired communication, such as Ethernet module 270 for connecting to a local area network (LAN) 272. As further shown, first device 102 can also include a global navigation satellite system (GNSS) receiver (RXR) 274, which can receive signals from GNSS satellite 276 in order to provide location information. It is appreciated that the location of first device 102 can also be obtained or determined via network-assisted WiFi trilateration. This location information can be utilized in one embodiment to determine whether the current location of the first device 102 has a bearing on the type of connectivity access that can be provided to a second device (i.e., geographic restrictions may apply).

Figure 3:
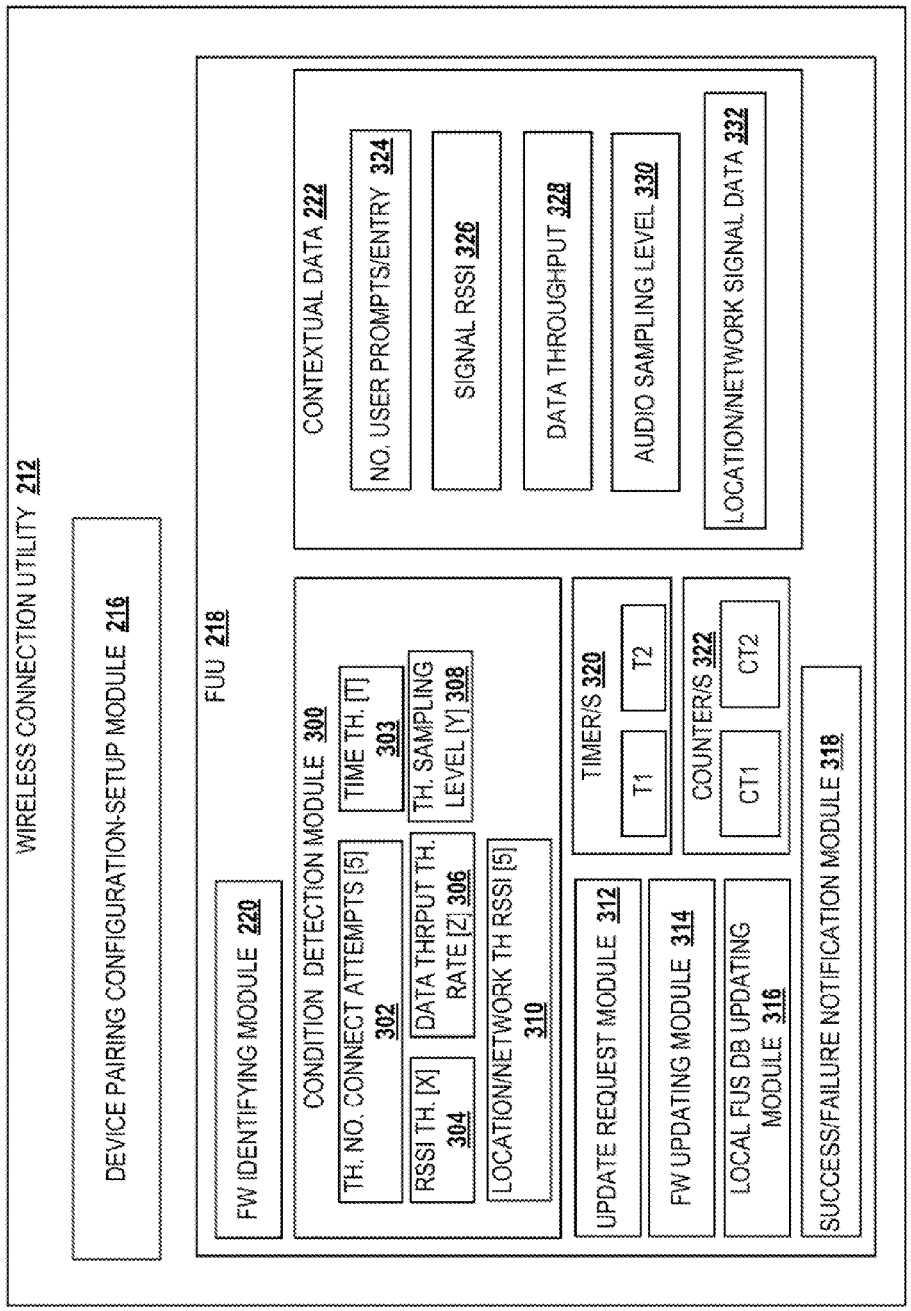
FIG. 3 illustrates an expanded view of the functional modules within the firmware updating utility (FUU) located within the wireless connection utility of the first device, in accordance with one or more embodiments.

FIG. 3 illustrates example functional modules within an expanded view of the firmware updating utility (FUU) 218 located within the wireless connection utility 212 of the first device 102 (FIG. 1). FUU 218 includes FW identifying module 220, utilized to detect and/or otherwise identify the firmware version being utilized by a connected second device, and contextual data 222 which identifies a series of different contexts related to the paired connection and/or operation of the second device that are monitored by first device 102 (FIG. 1).

FUU 218 also includes condition detection module 300, update request module 312, FW update triggering module 314, local FUS DB updating module 316, and success/failure notification module 318. Each module includes software code that can be executed to provide one or more of the functions described herein. Condition detection module 300 monitors a series of different conditions related to the connection between the two devices, the operation of the second device, and in some instances, the operation of the first device while connected to the second device. Included within the series of monitored conditions are, without limitation, (i) the number of attempts required to complete the initial pairing connection, (ii) the RSSI detected from the second device, (iii) the rate of data throughout over the established connection, (iv) sampling level of audio signal, and (v) signal strength expected based on a location and/or a network in which the connection is established.

For purposes of the description herein, several different contexts are identified that produce different contextual data 222. These different contexts are associated with one or more conditions that can be monitored and/or detected by first device 102 (FIG. 1). Included within the monitored conditions of the illustrative embodiment are, without limitation, (i) the number of attempts required and/or recorded during establishment of a pairing connection 324, (ii) the RSSI detected from the second device 326, (iii) the rate of data throughout over the established connection 328, (iv) a current sampling level of the audio signal 330, and (v) location/network signal data 332 identifying the signal strength detected within a known location and/or a known network in which the connection is established. With the last condition, the expected signal strength is associated with the current location and/or network and that expected signal strength can change based on a current location and/or network.

Associated with each of the monitored conditions are established threshold values, presented within condition detection module 300. These threshold values are utilized to determine when any one of the conditions are not within an expected range and would thus trigger a potential firmware update. As shown, the threshold values include threshold number of connection attempts 302, signal RSSI threshold 304, data throughput threshold 306, threshold audio sampling level 308, and location and/or network signal RSSI threshold 310. Each variable is shown having a representative value in brackets [ ], with threshold number of connection attempts indicated as having a threshold value of 5 connection attempts, as one example. During processing by FUU 218, condition detection module 300 determines when a particular monitored condition has detected values (from captured contextual data 222) that fall outside of the threshold established for that condition. Within the description which follows, the term condition generally refers to any situation in which one or more of the contextual data 222 falls outside of the established threshold for the associated monitored condition. Thus, for example, when the RSSI of the signal 326 is below the RSSI threshold 304 (e.g., value X), a condition is identified, which triggers the firmware update process. As another example, when the number of user attempts 324 to establish a pairing connection surpasses the threshold number of attempts 302 (e.g., five attempts), a condition is identified, triggering the firmware update process.

As one additional aspect of the disclosure, FUU 218 includes one or more timers 320 and one or more counters 322. Timers 320 and counters 322 are utilized by FUU 218 during the monitoring of the different conditions in order to track the different contexts and determine when a condition occurs. For example, a first timer T1 and first counter CT1 can be utilized by FUU 218. Then, when the at least one context comprises user inputs and connectivity attempts, the FUU 218 configures the first device 102 (FIG. 1) to: monitor, using CT1, a number of attempts to connect to the second device; and when the number of attempts 324 (i.e., the value of CT1) reaches a first threshold number 302, the FUU 218: determines whether a last received signal strength indication (RSSI) reading 326 was above a threshold RSSI 304; and when the last RSSI reading 326 was above the threshold RSSI 304, trigger the search for the firmware update.

Additionally, in monitoring the number of attempts, the FUU 218 further configures the device 102 (FIG. 1) to: set a timer (e.g., T1) at a first failed attempt to connect to the second device; monitor, via T1, an elapsed time between the first failed attempt and the first threshold number of attempts 302; trigger the search for a firmware update only when the elapsed time T1 is below a time threshold (T) 303; and reset the timer T1 when the timer reaches the time threshold 303.

The above introduced components of the FIGS. 2 and 3 provide a wireless electronic device 102 (FIG. 1) having: at least one wireless communication mechanism that supports pairing connection with at least one second wireless device over a wireless connection; and a processor communicatively coupled to the at least one wireless communication mechanism. The processor executes a firmware updating utility (FUU) 218 that configures the electronic device 102 (FIG. 1) to: initiate a wireless connection to a second wireless device (e.g., BT earpiece 120 of FIG. 1); monitor at least one context associated with one of the wireless connection and the second wireless device; and when contextual data is received that indicates a condition affecting one or more of the wireless connection and operation of the second device, determine whether a firmware update for the second wireless device is available within a firmware update service (FUS) database based on a search of the FUS database. The firmware further configures the device 102 (FIG. 1) to trigger the first wireless device to initiate the firmware update for the second wireless device, when an available firmware update is received from the FUS database. According to one aspect, the FUU 218 triggering the first wireless device to initiate the firmware update comprises the FUU 218 causing the first wireless device to: transmit a command to place the second device in firmware update mode; and forward the firmware update to the second device.

According to one embodiment, the first wireless device includes a modem that enables remote access over a communication network to a firmware update service (FUS) having the FUS database associated therewith. And, the FUU further configures the device to: compile information related to the wireless connection, the second device, and the condition; and generate, using the compiled information, a request that initiates a check for the firmware update, the request including at least a second device identifier (ID), data identifying a current firmware version installed in the second device, and one or more of a machine identifier (MAC ID), a vendor ID, and a manufacturer ID. Then, when the FUS database is located within the first device, determining whether a firmware update is available comprises the FUU configuring the device to: compare the second device ID with device IDs located within the FUS database; and when a match of the second device ID is found within the FUS database, compare the current firmware version installed in the second device with a listed firmware version within the FUD database. When the listed firmware version is an updated version of the firmware compared to the current firmware version, the FUU 218 further retrieves the listed firmware version from the database to install in the second device. However, when a match of the second device ID is not found within the FUS database, the FUU 218 transmits the request to a remote service that provides a larger listing of second devices and associated firmware.

In an alternate embodiment, when the FUS database is affiliated with a FUS that is remotely located over a communication network to which the first device is communicatively connected, the FUU determines whether a firmware update is available by configuring the device to: transmit the request to the FUS via the communication network; and receive the firmware update from the FUS. Also, the FUU further configures the device to: receive an indication from the second device of whether the firmware update was successful; and when the firmware update was successful: determine whether the firmware update was successful in resolving the condition; and communicate to the FUS a feedback response indicating a success or failure of the firmware update in resolving the condition. Further, the FUU further configures the device to: communicate a failure of the firmware update to the FUS when the firmware update was not successful.

Figure 4A:
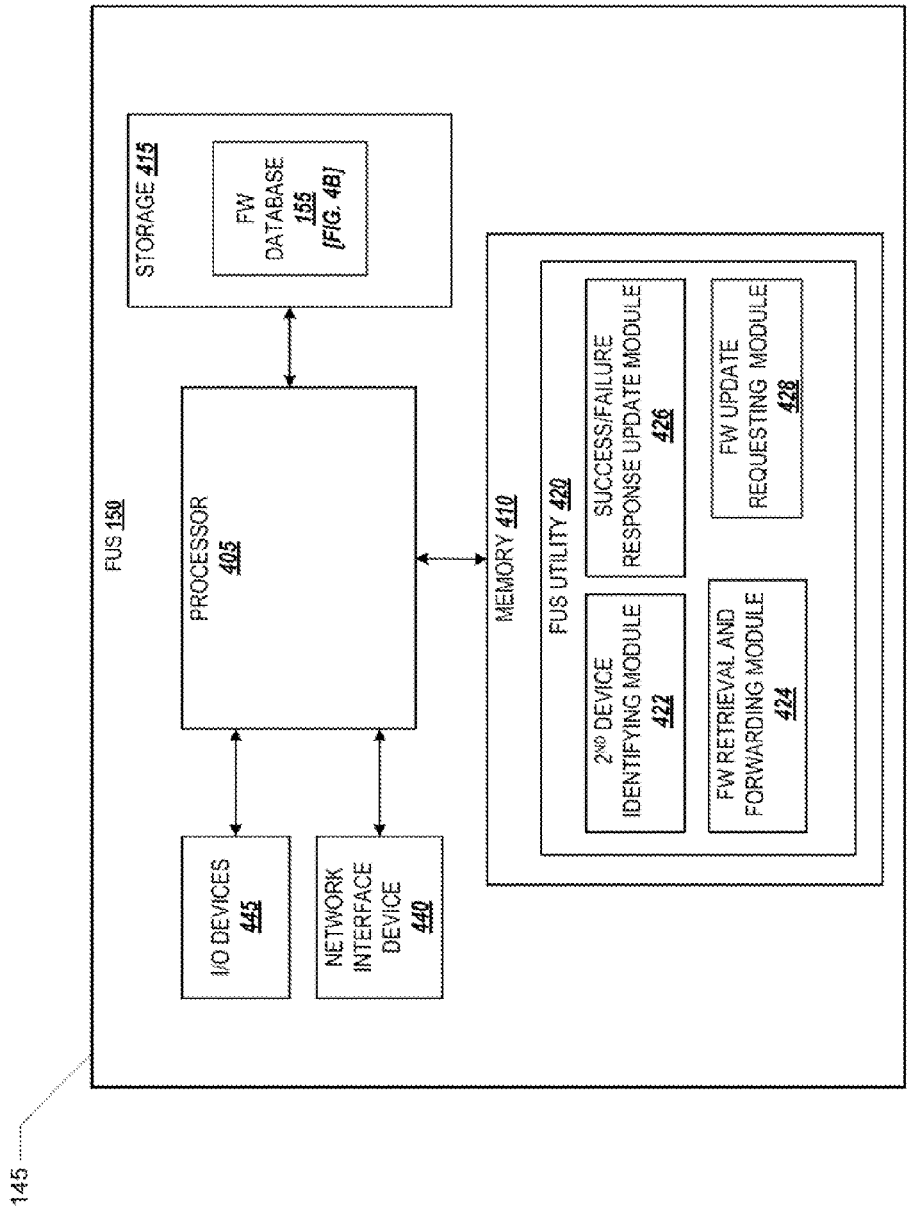
FIG. 4A provides a more detailed view of the functional makeup of the example FUS, in accordance with one or more embodiments.

FIG. 4A provides a more detailed view of the functional makeup of an example remote FUS 150, which maintains a FUS database 155 of wireless devices and their associated firmware, in accordance with one or more embodiments. FUS 150 is hosted on remote server 145. Remote server 145 includes processor 405, which is coupled to memory 410 and storage 415 via a system interconnect or bus (shown as bidirectional arrows). Also coupled to processor 405 are one or more I/O devices 445 and network interface device 440, which enables communication with or via an external network. FUS database 155 is maintained within storage 415, in the illustrated embodiment.

As further illustrated by FIG. 4B, FUS database 155 can be a data structure, such as a table, that includes a series of columns and rows within which are stored descriptive information about the various types of second devices that have been identified and for which firmware data and install (or update) instructions are known. An identifier of each of the known or tabulated second devices is presented within each row of FUS database 155 along with corresponding information associated with the second device. The first column of FUS database 155 provides the device type or ID 450, while the second and third columns respectively provide manufacturer ID 455 and model number 460 of the specific second devices. Column 4 then provides the FW version 465, which is the most recent or up-to-date firmware available for the particular second device. This column can be updated whenever a new update to existing firmware is produced by the manufacturer of the second device such that the FUS database 155 remains current. The next column provides the actual FW executable file 470 or a link to the executable file. In at least one embodiment, an additional column is provided with FW upgrade installation configuration information (UICI) 475, which includes details on how to place the second device into firmware upgrade mode. These instructions may be provided as executable modules that are run on first device or triggered to execute on second device within a paired connection. FUS 150 (FIG. 4A) updates FUS database 155 whenever a new firmware is released for the particular second devices. FUS 150 (FIG. 4A) also updates FUS database 155 to include any new second devices that are not currently mapped within FUS database 155.

According to one aspect, FUS database 155 can also be utilized to track various issues that can occur with the second device as well as the ability of the firmware update to fix those issues. Thus, for example, FUS database 155 can include a listing of conditions 480 that can affect the operation of the specific second device and/or the pairing connection to a first device. Correlation score 485 provides a value within an established range (e.g., 0 to 9) which identifies the level of correlation between performance of a firmware upgrade, using the most current up-to-date version of the firmware, with resolving the particular issue or condition identified. In one embodiment, FUS 150 (FIG. 4A) continually updates this correlation score 485 to account for each firmware upgrade that is initiated by FUS 150 (FIG. 4A). FUS 150 (FIG. 4A) updates (increases or decreases) the correlation score based on a feedback received from the first device of whether or not the firmware upgrade was successful in resolving a particular one of the identified conditions. It is appreciated that in some scenarios, a firmware update would not necessarily resolve a particular condition detected with a second device and/or the pairing connection with the first device. In such instances, the correlation score 485 would be below a certain threshold correlation score (e.g. less than 5), in which case, the FUS 150 (FIG. 4A) can refuse to provide the firmware upgrade or may issue a request to the manufacturer to provide a version of the firmware to correct the detected conditions.

It is appreciated that the FUS database 155, including the content and specific sequencing of information within each row and the columns provided, is provided solely for example. Other formats and configurations or layouts of different embodiments of FUS databases can be implemented in one or more alternate embodiments. The presented example is therefore not intended to imply any limitations with respect to the actual implementation of FUS database 155.

Returning to FIG. 4A, firmware is stored within memory 410 and includes FUS utility 420. FUS utility 420 includes several functional components including $2^{nd}$ device identifying module 422, FW retrieval and forwarding module 424, success/failure response update module 426, and firmware update requesting module 428, which includes code for handling detection of a new second device. Additional aspects of the processing completed by FUS 150 and in particular by execution of FUS utility 420 on processor 405 are briefly presented within the description of method 800 of FIG. 8. It is appreciated that in at least one embodiment in which all processing occurs local to the first device 102 (FIG. 1), the functional modules of FUS utility 420 are implemented as sub-components of FUU 218 (FIG. 2), such that first device 102 (FIG. 1) provides all of the stated checks for firmware upgrades in response to detection of the conditions. These conditions are associated with the various contexts being monitored by the first device.

In one embodiment, at least one context comprises performance throughput; and the FUU 218 (FIG. 2) further configures the device to: detect that a performance throughput is below a threshold throughput for a frequency and channel setting of the wireless connection; and trigger the search for the firmware update in response to the performance throughput being below the threshold throughput.

In another embodiment, the at least one context comprises signal quality, and the FUU 218 (FIG. 4A) further configures the device to: detect that a signal quality is below a threshold quality level for a frequency and channel setting of the wireless connection; and trigger the search for the firmware update in response to the signal quality being below the threshold signal quality level.

In yet another embodiment, the at least one context comprises signal strength within at least one of a known location and a current network, and the FUU 218 (FIG. 2) further configures the device to: detect that a signal strength for at least the known location and the current network is below an expected signal strength threshold for that location and network; and trigger the search for the firmware update in response to the detected signal strength being below the expected signal strength threshold.

According to one aspect, the FUU 218 (FIG. 2) further configures the device to: check for a first device firmware update and update the first device with the first device firmware update; detect an update of a wireless protocol for the first device within the first device firmware update; identify that the first device and the second device are designed to operate using a same wireless protocol; retrieve wireless protocol identifying data from the second device to compare with the updated wireless protocol of the first device; and trigger the search for the firmware update in response to identifying that a current wireless protocol of the second device is not up to date relative to the updated wireless protocol of the first device.

Figure 5:
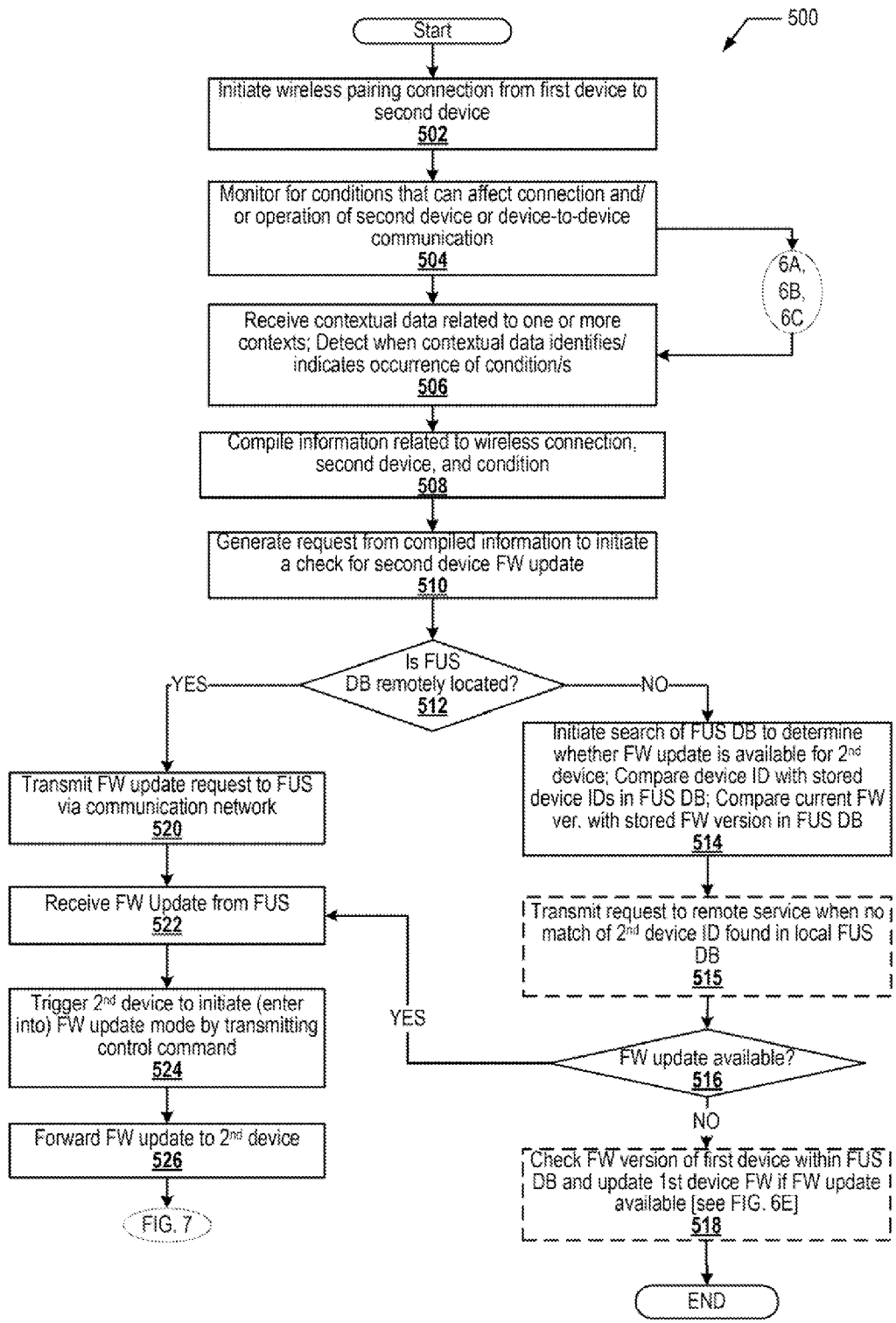
FIG. 5 is a flow chart of the general method of triggering an updated of firmware of a connected second device based on detection of a condition with the paired connection and/or the second device, according to one embodiment.

FIG. 5 provides a flow chart of a method for updating firmware of a connected second device based on detected condition/s related to one or more contexts being monitored, in accordance with one embodiment. Specifically, the method facilitates updating firmware when the firmware of the second device is not a more recent version and the second device and/or the connection to the second device is not operating at optimal (or above threshold) levels. According to an illustrative embodiment, the various features of method 500 are performed by processor 202 (FIG. 2) executing code and software modules of FUU 218 (FIG. 2), and the method 500 is thus described as being performed by the FUU 218 and/or the first device 102 (FIG. 1). Within the description of the flow charts, references to FUU 218 and first device 102 as well as the other presented components are understood to refer to the respective previous figures (i.e., FIGS. 1-4) within which the components are first introduced. The method 500 begins at the start block and proceeds to block 502, which provides a first device 102 initiating the establishment of a wireless pairing connection with a second device (e.g., BT earpiece 120, FIG. 1) that enables the first device 102 to communicate with the second device. At block 504, the FUU 218 configures the device to monitor at least one context associated with one of the first wireless connection and the second wireless device. The various different contexts that can be monitored are provided by FIGS. 6A-6E, described hereafter. At block 506, FUU 218 receives contextual data and detects when the contextual data identifies and/or indicates the occurrence of a condition. When contextual data is received that indicates a condition affecting one or more of the wireless connection and operation of the second device, FUU 218 performs a series of preparatory steps to trigger a firmware update including: compiling information related to the wireless connection, the second device, and the condition (block 508); and generating, using the compiled information, a request that initiates a check for the firmware update, the request including at least a second device identifier (ID), data identifying a current firmware version installed in the second device, and one or more of a machine identifier (MAC ID), a vendor ID, and a manufacturer ID (block 510).

Figure 6A:
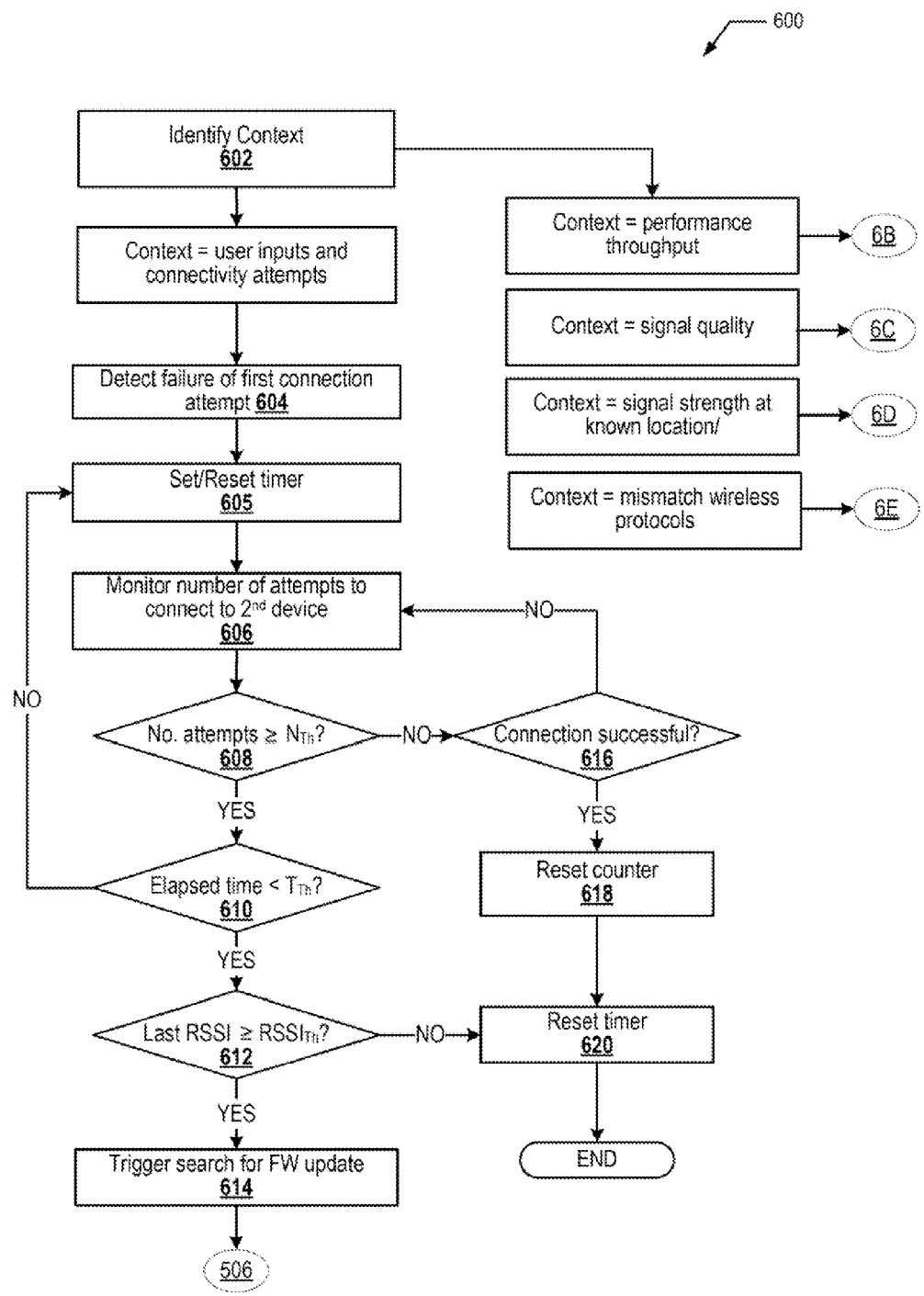
FIG. 6 (A-E) collectively provides a flow chart of one or more methods performed within a the first wireless device to identify conditions based on different contexts and respond by triggering one or more firmware updates to the connected second device, in accordance with a plurality of embodiments.
Figure 6E:
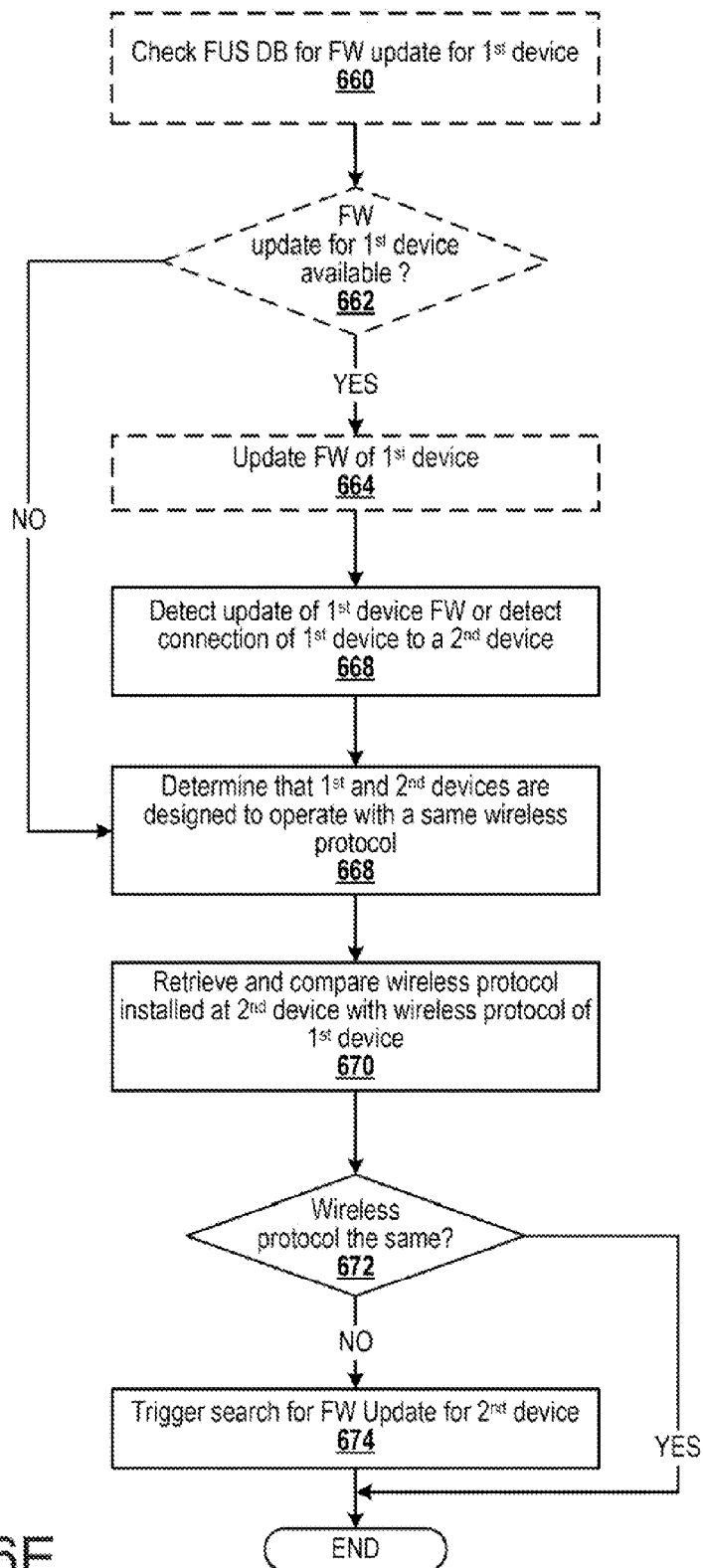

At decision block 512, FUU 218 determines whether the FUS database 155 is local to the first device 102 or remotely located. When the FUS database 155 is located within (or is local to) the first device 102, FUU 218 initiates a search within the local FUS database 155 (block 514) to determine whether a firmware update for the second wireless device is available. Specifically, FUU 218 determines whether a firmware update is available by comparing the second device ID with device IDs located within the FUS database 155. In one embodiment, when a match of the second device ID is not found within the FUS database 155, FUU 218 optionally transmits the request to a remote service that provides a larger listing of second devices and associated firmware (block 515). When a match of the second device ID is found within the FUS database 155, FUU 218 compares the current firmware version installed in the second device with a listed firmware version within the FUS database 155. Decision block 516 shows FUU 218 determining whether a FW update is available. When no firmware update is available within FUS database 155 for the second device, FUU 218 checks the firmware version of the first device within the FUS database 155 and updates the first device's firmware if a FW update is available (block 518). The method 500 then ends. It is appreciated that the processes of block 518 are optional (as indicated by the dashed lines) and can be implemented prior to any attempts to update the firmware of the second device, as the update of the first device firmware can, in certain instances, address and/or overcome the condition/s detected. However, the update of the first device firmware is secondary to the primary aspects of the disclosure. FIG. 6E illustrates several additional features related to how the update of the first device firmware can operate as one context that triggers the update of the second device firmware.

From decision block 516, when the listed firmware version is an updated firmware version from the device's current firmware version, FUU 218 retrieves the listed firmware version from the FUS database 155 to install in the second device (block 522). Also, from decision block 512, when the FUS database is remotely located, FUU 218 transmits the firmware update request to the FUS via the communication network (block 520) and the firmware update is received from the FUS (block 522). At block 524, FUU 218 triggers the first wireless device to initiate the firmware update for the second wireless device, when an available firmware update is received from the FUS database. According to one aspect, the triggering of the first wireless device to initiate the firmware update includes: transmitting a command to place the second device in firmware update mode. With the second device in firmware update mode, method 500 further includes forwarding the firmware update to the second device (block 526).

FIGS. 6A-6E illustrate a series of process flows related to the different contexts being monitored by the first device. As noted above, references to FUU 218 as well as other components are understood to refer to the respective previously described figures (i.e., FIG. 1-4) within which the components are first introduced. At FIG. 6A, method 600 begins at block 602 with FUU 218 identifying a context being monitored. When the context is the number of connectivity attempts, the method proceeds to block 604, at which FUU 218 detects failure of a first connection attempt. Contemporaneously with detecting the initial failure, FUU 218 sets (or resets) a timer allocated to time track the number of connection attempt failures (block 605). FUU 218 then monitors a number of attempts (e.g., using counter 322, FIG. 3) to connect to the second device (block 606). According to one embodiment, monitoring the number of attempts further comprises: setting the timer at a first failed attempt to connect to the second device; and monitoring an elapsed time between the first failed attempt and the first threshold number of attempts.

FUU 218 determines at decision block 608 when the number of attempts reaches or surpasses a threshold number of attempts without a successful connection. When the number of attempts is equal to or greater than the threshold number, FUU 218 checks at block 610 whether the elapsed time is less than a time threshold (e.g., 20 seconds). When the elapsed time is less than the time threshold, FUU 218 determines whether a last received signal strength indication (RSSI) reading was equal to or greater than a threshold RSSI (block 612). And, when the last RSSI reading was equal to or greater than the threshold RSSI, FUU 218 triggers the search for the firmware update (block 614). Notably, FUU 218 triggers the search for the firmware update only when the elapsed time is below the time threshold. When the elapsed time is equal to or greater than the time threshold, the method returns to block 605 and the timer is reset.

Returning to decision block 608, when the number of attempts is less than the threshold number, FUU identifies at block 616 whether the last connection attempt was successful. FUU 218 continues to monitor the number of attempts when the connection is not successful. However, when the connection is successful, FUU 218 resets the counter (block 618). FUU 218 also resets the timer when the connection was successful or when the last RSSI is determined (at block 612) to be less than the threshold RSSI (block 620). Method 600 then ends.

From block 602, when the at least one context includes performance throughput, method proceeds to FIG. 6B and block 630 at which FUU 218 detects that a performance throughput is below a threshold throughput for a frequency and channel setting of the wireless connection. Specifically, FUU 218 detects that a sequence of throughput measurements (over a period of time) indicates that the throughout is below a throughput threshold for the given frequency and channel established for the wireless connection between the two devices. FUU 218 then triggers the search for the firmware update in response to the performance throughput being below the threshold throughput (block 632).

From block 602, when the at least one context includes signal quality, method 600 proceeds to FIG. 6C and block 640 at which FUU 218 detects that the signal quality is below a threshold quality level for a frequency and channel setting of the wireless connection. FUU 218 then triggers the search for the firmware update in response to the signal quality being below the threshold signal quality level (block 642).

From block 602, when the at least one context includes signal strength within at least one of a known location and a current network, method 600 proceeds to FIG. 6D and block 650 at which FUU 218 detects that the signal strength for at least the known location and the current network is below an expected signal strength threshold for that location and/or network. FUU 218 triggers the search for the firmware update in response to the detected signal strength being below the expected signal strength threshold (block 652).

From block 602, when the at least one context includes a mismatch of wireless protocol between the two devices, method 600 proceeds to FIG. 6E and blocks 670 and 672 at which FUU 218 detects that the first and second devices are designed to operate with a same wireless protocol. In one alternate embodiment, several optional steps are completed prior to this determination. As shown by the optional blocks beginning at block 660, FUU 218 checks the FUS database for a firmware update of the first device. FUU 218 then determines at decision block 662 whether the firmware update for the first device is available and when the update is available, FUU 218 updates the firmware of the first device (block 664). FUU 218 then detects an update of the firmware of the first device (block 668). The timing of the FW update at the first device can be contemporaneous with the detection of one of the other conditions. And, the above optional steps can be performed in some embodiments to trigger the remainder of the method processes. However, the FW update can also be performed at any time, and the following functions and/or features can then be completed once the particular second device is connected to the first device. Thus, in one embodiment, the FUU performs the analysis when a connection to the second device is detected and/or the connected second device is identified. Proceeding to block 670, FUU 218 retrieves wireless protocol identifying data from the second device and compares the protocol with the updated wireless protocol of the first device. FUU 218 then determines at decision block 672 whether the wireless protocols are the same. In response to identifying that a current wireless protocol of the second device is not the same as the updated wireless protocol of the first device (indicating the second device's wireless protocol is not up to date relative to that of the first device), FUU 218 triggers a search for the firmware update (block 674). Method 600 then ends. In response to identifying that a current wireless protocol of the second device is the same as the updated wireless protocol of the first device, method 600 ends.

Figure 7:
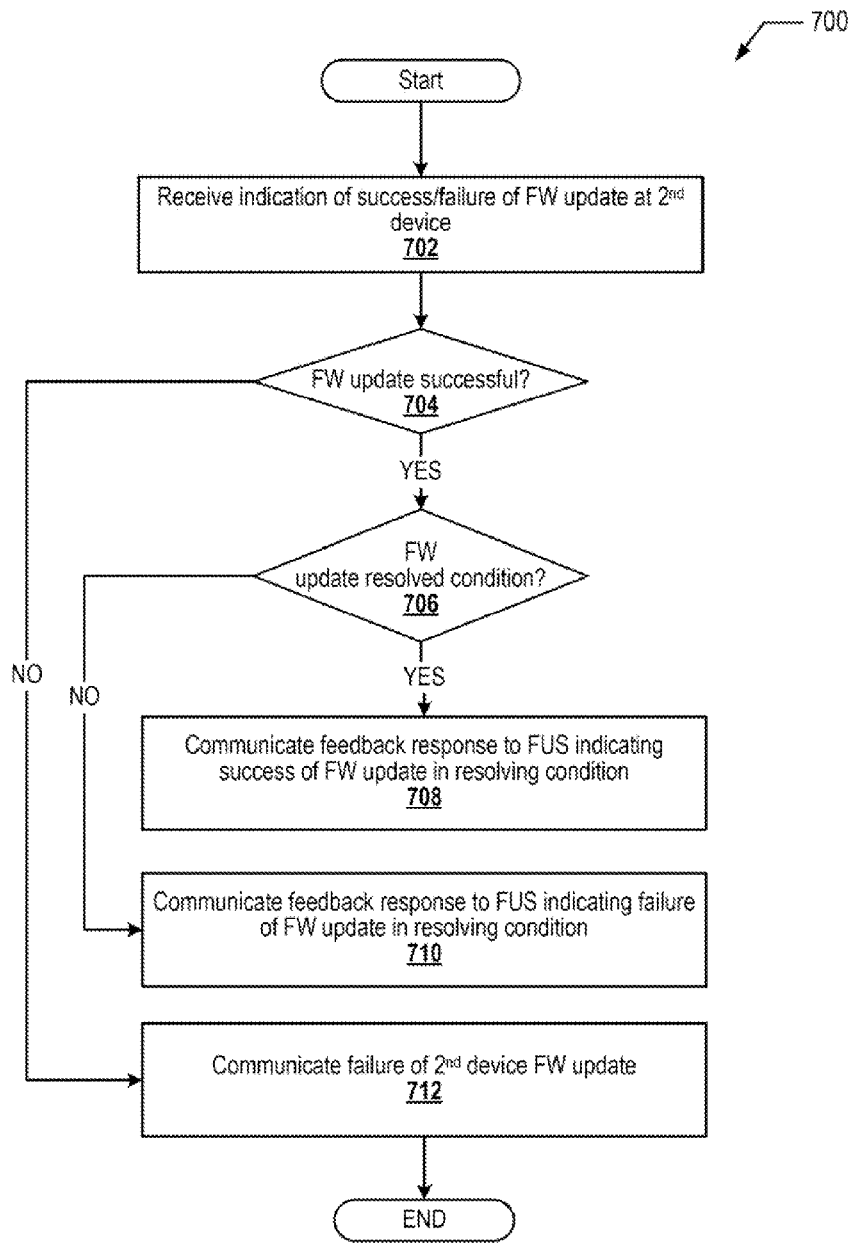
FIG. 7 is a flow chart of a method for providing feedback response to a FUS based on a success or failure of the FM update in fixing a detected condition, according to one embodiment.

FIG. 7 is a flow chart of a method 700 for providing feedback response to a FUS based on a success or failure of the FW update in fixing a detected condition, according to one embodiment. Method 700 begins at start block and proceeds to block 702 at which FUU 218 receives an indication from the second device of whether the firmware update was successful. FUU 218 determines at decision block 704 whether the firmware update was successful. When the firmware update was successful, FUU 218 determines at decision block 706 whether the firmware update was successful in resolving the condition. FUU 218 communicates to the FUS a feedback response indicating a success (block 708) or failure (block 710) of the firmware update in resolving the condition. Returning to block 704, when the firmware update was not successful, FUU 218 communicates the failure of the firmware update to the FUS (block 712). Method 700 then ends.

Figure 8:
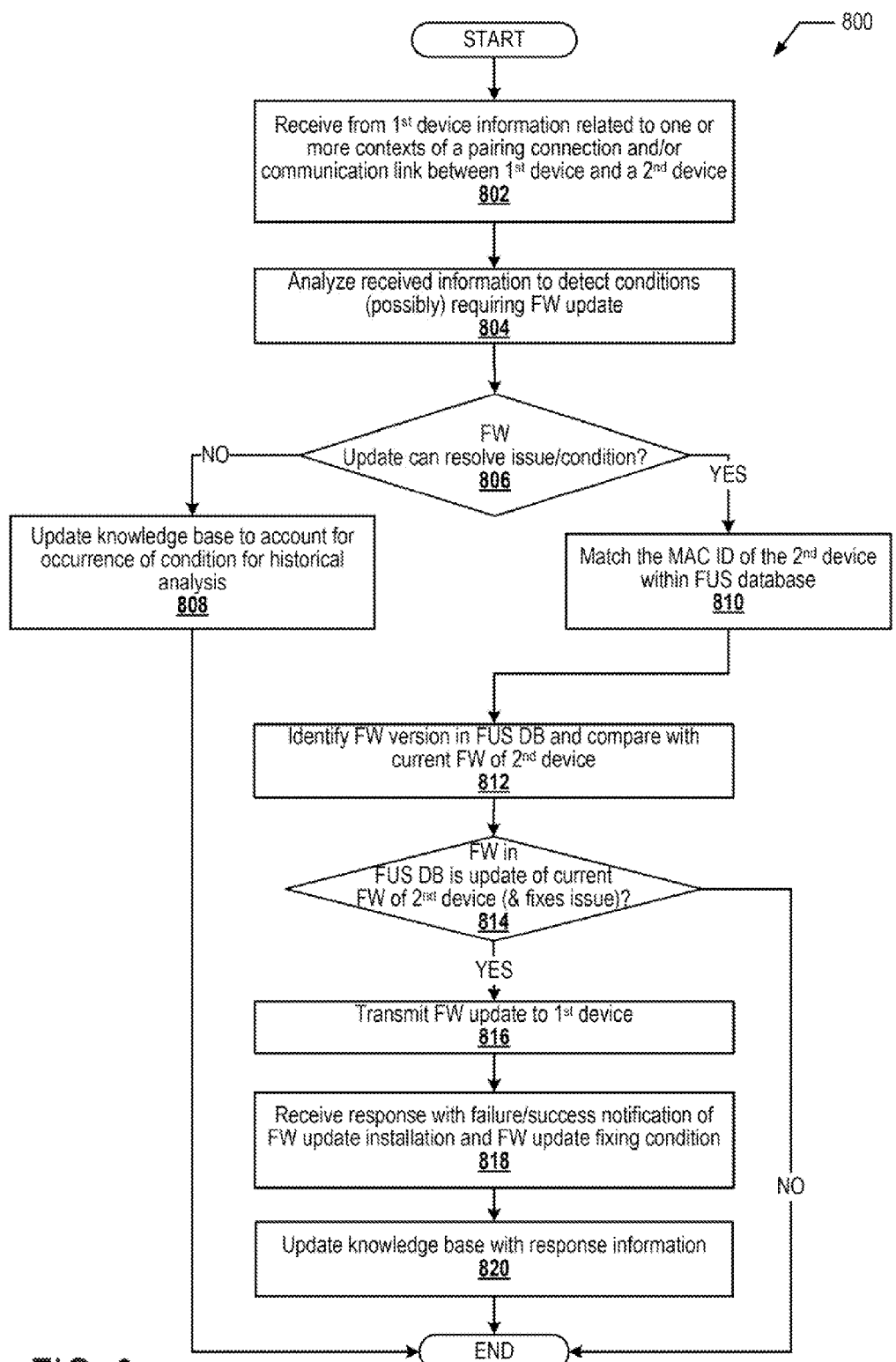
FIG. 8 is a flow chart of a method implemented by a FUS to identify a correct firmware required for one or more connected wireless devices and trigger an update of the firmware of one or more of the connected wireless devices, in accordance with one or more embodiments.

FIG. 8 is a flow chart of a method 800 implemented by a FUS to identify a correct firmware required for one or more connected wireless devices and trigger an update of the firmware of one or more of the connected wireless devices, in accordance with one or more embodiments. It is appreciated that the various processes provided by method 800 can be implemented at or on FUS server 145. Thus, in the illustrative embodiments, the functions of FUS utility 420 are provided at remote server 145, hosting the FUS 150 and FUS database 155. FUS 150 is remotely accessed by first device 102 to determine whether a firmware update is available for the connected second device within the FUS database 155. According to one alternate embodiment, the FUS 150 and/or certain functional modules of FUU utility 218 (FIG. 3) can execute on processor 202 within the first device 102, rather than at the remote server 145. Using the remote server implementation, method 800 begins at start block and moves to block 802, at which FUS utility 420 receives information from the first device about one or more contexts associated with a pairing connection between the first device and a second device. At block 804, FUS utility 420 analyzes the received information to detect one or more conditions that could possibly require an upgrade or update of the firmware of at least the second device. FUS utility 420 determines at decision block 806 if the firmware update can resolve the identified condition. When FUS utility 420 determines that the firmware update is not able to resolve the condition, the FUS utility 420 updates the knowledge base of historical analysis recorded within the FUS database 155 to account for the detected occurrence of the condition (block 808). In performing this determination, FUS utility 420 can rely on correlation scores compiled over a historical period of tracking the condition and effects of performing the firmware update to the second device in eliminating and/or reducing the occurrence of the condition. Method 800 then ends.

When the firmware update is determined at decision block 806 to be able to resolve the condition, FUS utility 420 matches the MAC ID of the second device within the FUS database 155 (block 810). Then, the FUS utility 420 compares the firmware version in the FUS database 155 with the current firmware version installed in the second device (block 812), and FUS utility 420 determines at decision block 814 whether the firmware in the FUS database 155 is in fact an upgrade or newer version of the firmware. When the firmware is not a newer or upgraded version, method 800 ends. However, when the firmware is a newer or updated version, FUS utility 420 retrieves the firmware from the FUS database 155 and transmits the firmware update to the first device (block 816). Subsequently, FUS utility 420 receives a response with a failure or success notification that indicates (i) whether the firmware installation was successful and (ii) assuming success of the firmware installation, whether the firmware upgrade resolved and/or fixed the conditions (block 818). FUS utility 420 then updates the knowledge base according to the response information received (block 820). Method 800 then ends.

In the flow charts of FIGS. 5-8 presented herein, certain processes of the methods can be combined, performed simultaneously or in a different order, or perhaps omitted, without deviating from the spirit and scope of the described innovation. While the method steps are described and illustrated in a particular sequence, use of a specific sequence of steps is not meant to imply any limitations on the innovation. Changes may be made with regards to the sequence of steps without departing from the spirit or scope of the present innovation. Use of a particular sequence is therefore, not to be taken in a limiting sense, and the scope of the present innovation is defined only by the appended claims.

As will be appreciated by one skilled in the art, embodiments of the present innovation may be embodied as a system, device, and/or method. Accordingly, embodiments of the present innovation may take the form of an entirely hardware embodiment or an embodiment combining software and hardware embodiments that may all generally be referred to herein as a "circuit," "module" or "system."

Aspects of the present innovation are described below with reference to flowchart illustrations and/or block diagrams of methods, apparatus (systems) and computer program products according to embodiments of the innovation. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

While the innovation has been described with reference to exemplary embodiments, it will be understood by those skilled in the art that various changes may be made and equivalents may be substituted for elements thereof without departing from the scope of the innovation. In addition, many modifications may be made to adapt a particular system, device or component thereof to the teachings of the innovation without departing from the essential scope thereof. Therefore, it is intended that the innovation not be limited to the particular embodiments disclosed for carrying out this innovation, but that the innovation will include all embodiments falling within the scope of the appended claims. Moreover, the use of the terms first, second, etc. do not denote any order or importance, but rather the terms first, second, etc. are used to distinguish one element from another.

The terminology used herein is for the purpose of describing particular embodiments only and is not intended to be limiting of the innovation. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present innovation has been presented for purposes of illustration and description, but is not intended to be exhaustive or limited to the innovation in the form disclosed. Many modifications and variations will be apparent to those of ordinary skill in the art without departing from the scope and spirit of the innovation. The embodiment was chosen and described in order to best explain the principles of the innovation and the practical application, and to enable others of ordinary skill in the art to understand the innovation for various embodiments with various modifications as are suited to the particular use contemplated.

What is claimed is:

1. A method comprising:
    a first wireless device initiating a wireless connection to a second wireless device;
    monitoring at least one context associated with one of the wireless connection or the second wireless device;
    in response to determining that contextual data for the at least one context is received that indicates a condition affecting one or more of the wireless connection or operation of the second device:
        determining whether a firmware update for the second wireless device is available within a firmware update service (FUS) database; and
        in response to determining that an available firmware update is received from the FUS database, triggering the first wireless device to initiate the firmware update for the second wireless device.

2. The method of claim 1, wherein the triggering of the first wireless device to initiate the firmware update comprises:
    transmitting a command to place the second device in firmware update mode; and
    forwarding the firmware update to the second device.

3. The method of claim 1, further comprising:
    compiling information related to the wireless connection, the second device, and the condition; and
    generating, using the compiled information, a request that initiates a check for the firmware update, the request including at least a second device identifier (ID), data identifying a current firmware version installed in the second device, and one or more of a machine identifier (MAC ID), a vendor ID, or a manufacturer ID;
    wherein, when the FUS database is located within the first device, the determining whether a firmware update is available comprises:
    comparing the second device ID with device IDs located within the FUS database;
    when a match of the second device ID is found within the FUS database, comparing the current firmware version installed in the second device with a listed firmware version within the FUD database;
    when the listed firmware version is an updated version of the firmware compared to the current firmware version, retrieving the listed firmware version from the database to install in the second device; and when a match of the second device ID is not found within the FUS database, transmitting the request to a remote service that provides a larger listing of second devices and associated firmware; and wherein, when the FUS database is affiliated with a FUS that is remotely located over a communication network to which the first device is communicatively connected, the determining of whether a firmware update is available further comprises:

transmitting the request to the FUS via the communication network; and receiving the firmware update from the FUS.

4. The method of claim 3, further comprising:
receiving an indication from the second device of whether the firmware update was successful;
when the firmware update was successful:
determining whether the firmware update was successful in resolving the condition;
communicating to the FUS a feedback response indicating a success or failure of the firmware update in resolving the condition; and
communicating a failure of the firmware update to the FUS when the firmware update was not successful.

5. The method of claim 1, wherein:
at least one context comprises user inputs and connectivity attempts; and
the method further comprises:
monitoring a number of attempts to connect to the second device; and
when the number of attempts reaches a first threshold number:
determining whether a last received signal strength indication (RSSI) reading was above a threshold RSSI; and
when the last RSSI reading was above the threshold RSSI, triggering the search for the firmware update.

6. The method of claim 5, wherein monitoring the number of attempts further comprises:
setting a timer at a first failed attempt to connect to the second device;
monitoring an elapsed time between the first failed attempt and the first threshold number of attempts;
triggering the search only when the elapsed time is below a time threshold; and
resetting the timer when the timer reaches the time threshold.

7. The method of claim 1, wherein:
at least one context comprises performance throughput; and
the method further comprises:
detecting that a performance throughput is below a threshold throughput for a frequency and channel setting of the wireless connection; and
wherein determining whether a firmware update for the second wireless device is available within the FUS database comprises triggering a search for the firmware update in response to the performance throughput being below the threshold throughput.

8. The method of claim 1, wherein:
at least one context comprises signal quality; and
the method further comprises:
detecting that a signal quality is below a threshold quality level for a frequency and channel setting of the wireless connection; and
wherein determining whether a firmware update for the second wireless device is available within the FUS database comprises triggering a search for the firmware update in response to the signal quality being below the threshold signal quality level.

9. The method of claim 1, wherein:
at least one context comprises signal strength within at least one of a known location and a current network; and
the method further comprises:
detecting that a signal strength for at least the known location and the current network is below an expected signal strength threshold for that location and network; and
wherein determining whether a firmware update for the second wireless device is available within the FUS database comprises triggering a search for the firmware update in response to the detected signal strength being below the expected signal strength threshold.

10. The method of claim 1, further comprising:
checking for a first device firmware update and updating the first device with the first device firmware update;
detecting an update of a wireless protocol for the first device within the first device firmware update;
identifying that the first device and the second device operate using a same wireless protocol;
retrieving wireless protocol identifying data from the second device to compare with the updated wireless protocol of the first device; and
triggering a search for the firmware update in response to identifying that a current wireless protocol of the second device is not up to date relative to the updated wireless protocol of the first device.

11. A wireless electronic device comprising:
at least one wireless communication mechanism that supports pairing connection with at least one second wireless device over a wireless connection; and
a processor communicatively coupled to the at least one wireless communication mechanism and which executes a firmware updating utility (FUU) that configures the electronic device to:
initiate a wireless connection to a second wireless device;
monitor at least one context associated with one of the wireless connection or the second wireless device;
in response to determining that contextual data for the at least one context is received that indicates a condition affecting one or more of the wireless connection or operation of the second device:
determine whether a firmware update for the second wireless device is available within a firmware update service (FUS) database; and
in response to determining that an available firmware update is received from the FUS database, trigger the first wireless device to initiate the firmware update for the second wireless device.

12. The wireless electronic device of claim 11, wherein the FUU triggering the first wireless device to initiate the firmware update comprises the FUU causing the device to:
transmit a command to place the second device in firmware update mode; and
forward the firmware update to the second device.

13. The wireless electronic device of claim 11, further comprising:
a modem that enables remote access over a communication network to a firmware update service (FUS) having the FUS database associated therewith;
wherein the FUU further configures the device to:
compile information related to the wireless connection, the second device, and the condition; and
generate, using the compiled information, a request that initiates a check for the firmware update, the request including at least a second device identifier (ID), data identifying a current firmware version installed in the second device, and one or more of a machine identifier (MAC ID), a vendor ID, or a manufacturer ID;
wherein, when the FUS database is located within the first device, determining whether a firmware update is available comprises the FUU configuring the device to:
compare the second device ID with device IDs located within the FUS database;
when a match of the second device ID is found within the FUS database, compare the current firmware version installed in the second device with a listed firmware version within the FUD database;
when the listed firmware version is an updated version of the firmware from the current firmware version, retrieve the listed firmware version from the database to install in the second device; and
when a match of the second device ID is not found within the FUS database, transmit the request to a remote service that provides a larger listing of second devices and associated firmware; and
wherein, when the FUS database is affiliated with a FUS that is remotely located over a communication network to which the first device is communicatively connected, the FUU determines whether a firmware update is available by configuring the device to:
transmit the request to the FUS via the communication network; and
receive the firmware update from the FUS.

14. The wireless electronic device of claim 11, wherein the FUU further configures the device to:
receive an indication from the second device of whether the firmware update was successful;
when the firmware update was successful:
determine whether the firmware update was successful in resolving the condition;
communicate to the FUS a feedback response indicating a success or failure of the firmware update in resolving the condition; and
communicate a failure of the firmware update to the FUS when the firmware update was not successful.

15. The wireless electronic device of claim 11, wherein:
at least one context comprises user inputs and connectivity attempts; and
the FUU further configures the device to:
monitor a number of attempts to connect to the second device; and
when the number of attempts reaches a first threshold number:
determine whether a last received signal strength indication (RSSI) reading was above a threshold RSSI; and
when the last RSSI reading was above the threshold RSSI, trigger the search for the firmware update.

16. The wireless electronic device of claim 15, wherein in monitoring the number of attempts, the FUU further configures the device to:

set a timer at a first failed attempt to connect to the second device;
monitor an elapsed time between the first failed attempt and the first threshold number of attempts;
trigger the search only when the elapsed time is below a time threshold; and
reset the timer when the timer reaches the time threshold.

17. The wireless electronic device of claim 11, wherein:
at least one context comprises performance throughput; and
the FUU further configures the device to:
detect that a performance throughput is below a threshold throughput for a frequency and channel setting of the wireless connection; and
trigger the search for the firmware update in response to the performance throughput being below the threshold throughput.

18. The wireless electronic device of claim 11, wherein:
at least one context comprises signal quality; and
the FUU further configures the device to:
detect that a signal quality is below a threshold quality level for a frequency and channel setting of the wireless connection; and
trigger the search for the firmware update in response to the signal quality being below the threshold signal quality level.

19. The wireless electronic device of claim 11, wherein:
at least one context comprises signal strength within at least one of a known location and a current network; and
the FUU further configures the device to:
detect that a signal strength for at least the known location and the current network is below an expected signal strength threshold for that location and network; and
trigger the search for the firmware update in response to the detected signal strength being below the expected signal strength threshold.

20. The wireless electronic device of claim 11, wherein the FUU further configures the device to:
check for a first device firmware update and update the first device with the first device firmware update;
detect an update of a wireless protocol for the first device within the first device firmware update;
identify that the first device and the second device are designed to operate using a same wireless protocol;
retrieve wireless protocol identifying data from the second device to compare with the updated wireless protocol of the first device; and
trigger the search for the firmware update in response to identifying that a current wireless protocol of the second device is not up to date relative to the updated wireless protocol of the first device.

* * * * *